3,440,056
CHEMICALLY PRESERVED FERMENTED
MALT BEVERAGES
Thomas F. McFadden, New Bedford, and Theodore A. Schueler, South Dartmouth, Mass., assignors of one-third to Samuel E. Brown, New Bedford, Mass.
No Drawing. Filed Aug. 11, 1966, Ser. No. 571,728
Int. Cl. C12h *1/00;* B01j *1/16;* C09k *3/00*
U.S. Cl. 99—48    9 Claims

ABSTRACT OF THE DISCLOSURE

A fermented malt beverage containing a preserving amount of an imidazole compound or acid salt thereof represented by the formula

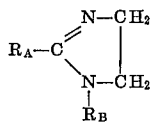

wherein $R_A$ is an aliphatic hydrocarbon radical, the carbon atoms of which range from 8 through 18, and $R_B$ is an alkanol radical.

---

This invention relates to the preservation by chemical additives beverages which usually require pasteurization before being packaged in bottles or cans for distribution. For example, fermented malt beverages such as beer and ale inevitably contain residual bacteria and yeast which, if not removed or inactivated, eventually spoil the beverage. As membrane filtration is much too slow for commercial practice, the common method of preserving the beverage has been pasteurization. This however, requires bulky and expensive apparatus which must be operated with great care, and such treatment modifies the flavor so that the beverage loses its freshness. It is an object of the present invention to provide chemical additives which can be readily introduced into freshly made beverages containing small amounts of bacteria and/or yeast, the additive acting as a surfactant to inactivate the elements in the beverage which would otherwise eventually spoil it.

One group of effective additives comprise imidazolines and their acid salts, this group being represented by the formula:

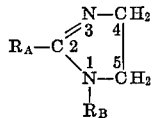

wherein $R_A$ is an aliphatic hydrocarbon chain, the carbon atoms of which range in number from 8 through 18, and $R_B$ is an alkanol group. The position numbers in the imidazoline ring are the same for the following examples of imidazolines.

Specific examples of this group are:

(1) 1-ethanol, 2-octyl imidazoline, the formula for which is:

$$CH_3(CH_2)_7—X$$

wherein X in this and the following examples of imidazolines is:

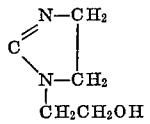

(2) 1-ethanol, 2-nonyl, imidazoline, the formula for which is:

$$CH_3(CH_2)_8—X$$

(3) 1-ethanol, 2-decyl, imidazoline, the formula for which is:

$$CH_3(CH_2)_9—X$$

(4) 1-ethanol, 2-undecyl, imidazoline, i.e., $$CH_3(CH_2)_{10}—X$$

(5) 1-ethanol, 2-lauryl, imidazoline, i.e., $$CH_3(CH_2)_{11}—X$$

(6) 1-ethanol, 2-tridecylic, imidazoline, i.e., $$CH_3(CH_2)_{12}—X$$

(7) 1-ethanol, 2-myristic, imidazoline, i.e., $$CH_3(CH_2)_{13}—X$$

(8) 1-ethanol, 2-pentadecylic, imidazoline, i.e., $$CH_3(CH_2)_{14}—X$$

(9) 1-ethanol, 2-palmitic, imidazoline, i.e., $$CH_3(CH_2)_{15}—X$$

(10) 1-ethanol, 2-heptadecyl, imidazoline, i.e., $$CH_3(CH_2)_{16}—X$$

(11) 1-ethanol, 2-stearic, imidazoline, i.e., $$CH_3(CH_2)_{17}—X$$

(12) 1-ethanol, 2-oleyl, imidazoline, i.e., $$C_8H_{17}CH=CH(CH_2)_8—X$$

Any food-grade acid can be reacted in stoichiometrically equivalent amounts with any of the foregoing imidazolines, preferably those wherein $R_A$ is the undecyl radical, the lauryl radical, the myristic radical, the heptadecyl radical or the oleyl radical to produce the acid salts. For the preservation of fermented malt beverages, lactic acid is preferred as a reagent for an imidazoline. The reaction equation is:

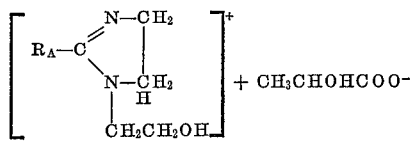

If, for example, the lactic acid is reacted with the imidazoline having the undecyl radical, the resulting cationic surfactant would be:

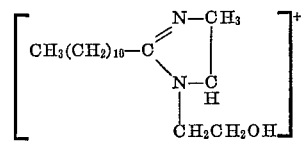

For commercial application of imidazoline to fermented malt beverages, the following procedure is recommended. Prepare a 10 percent (grams/milliliters) solution of imidazoline. Add two stoichiometrically equivalent weights of good-grade lactic acid and sufficient water and/or propylene glycol at about 70° C. to make a 2 percent (weight/volume) solution, agitating the mixture until solution is complete. Introduce this solution into the beverage as closely subsequent as practicable to the final filters, preferably by means of an apportionating pump, the rate of addition being such as to produce the desired concentration of additive in the final volume of beverage, the optimum concentration, up to 50 parts per million, depending on the condition of the beverage as indicated by periodic tests.

An advantageous feature of the use of an imidazoline is that precise metering of the additive is not required since an imidazoline salt in concentrations up to 100 parts per million by weight will not produce a permanent or difficultly redissolvable precipitate in the beverage. Slight variations in the action of apportioning equipment are tolerable in view of the almost immediate dispersability of imidazoline solutions in the beverage.

We claim:
1. A packaged unpasteurized finished fermented malt beverage containing a preserving amount of an imidazoline compound represented by the formula

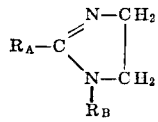

wherein $R_A$ is an aliphatic hydrocarbon radical the carbon atoms of which range from 8 through 18, and $R_B$ is an alkanol radical.

2. A beverage as claimed in claim 1, wherein $R_A$ is represented by the formula $CH_3(CH_2)_n$, the value of $n$ being a number from 7 to 17.

3. A beverage as claimed in claim 1, wherein $R_B$ is represented by the formula $CH_2CH_2OH$.

4. A beverage as claimed in claim 2, wherein $R_B$ is represented by the formula $CH_2CH_2OH$.

5. A beverage as claimed in claim 1, said compound being present in a concentration of up to 50 parts by weight per million parts by volume.

6. A packaged unpasteurized finished fermented malt beverage containing a preserving amount of an acid salt of an imidazoline compound represented by the formula

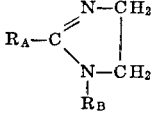

wherein $R_A$ is an aliphatic hydrocarbon radical the carbon atoms of which range from 8 through 18, and $R_B$ is an alkanol radical.

7. A beverage as claimed in claim 6 wherein said salt is obtained by reacting lactic acid with said compound.

8. A beverage as claimed in claim 6, wherein said salt in solution includes cations represented by the formula

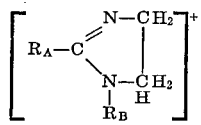

wherein $R_A$ is an aliphatic hydrocarbon radical and $R_B$ is an alkanol radical.

9. A beverage as claimed in claim 8, wherein said cations are represented by the formula

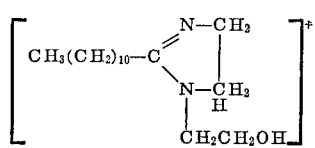

References Cited
UNITED STATES PATENTS

| | | | |
|---|---|---|---|
| 3,048,488 | 8/1962 | Strandskov et al. | 99—48 |
| 3,175,912 | 3/1965 | Strandskov et al. | 99—48 |
| 3,313,825 | 4/1967 | Rosenberg et al. | 260—309.6 |
| 3,389,999 | 6/1968 | Strandskov et al. | 99—48 |

A. LOUIS MONACELL, *Primary Examiner.*

D. M. NAFF, *Assistant Examiner.*

U.S. Cl. X.R.

99—31, 150, 155, 213; 252—405